UNITED STATES PATENT OFFICE.

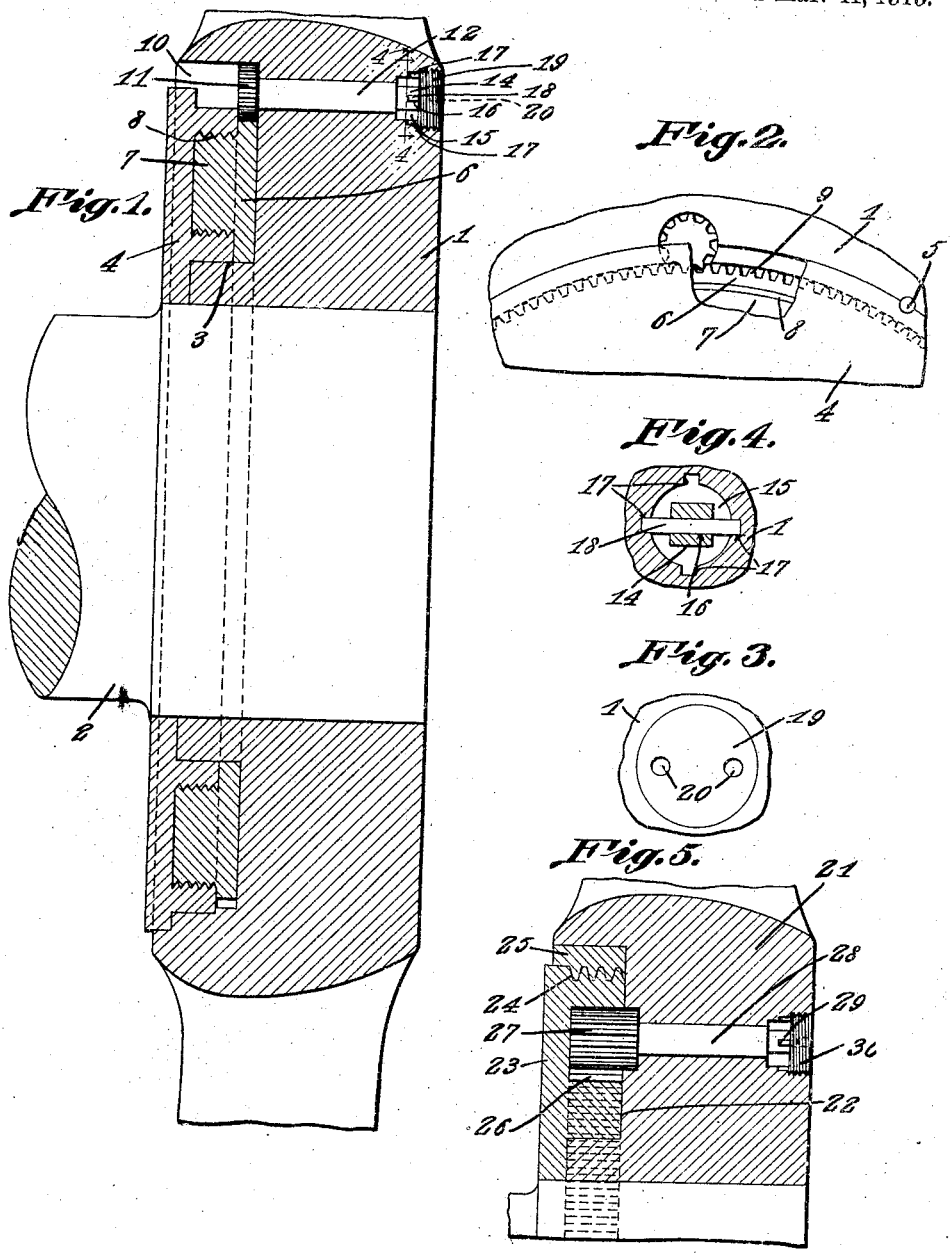

ALBERT J. SAMS, OF CHICAGO, ILLINOIS.

ADJUSTABLE HUB-PLATE.

1,296,856.  Specification of Letters Patent.  Patented Mar. 11, 1919.

Application filed June 3, 1918. Serial No. 238,071.

*To all whom it may concern:*

Be it known that I, ALBERT J. SAMS, a citizen of the United States, residing at Chicago, in the county of Cook and State of Illinois, have invented a new and useful Adjustable Hub-Plate, of which the following is a specification.

The device forming the subject matter of this application is a bearing plate for the hub of a wheel of a locomotive engine, and the invention aims to provide novel means for advancing the hub plate transversely of the hub wherein the plate is mounted.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in section, a device constructed in accordance with the invention, parts being broken away; Fig. 2 is a fragmental elevation of the structure shown in Fig. 1, parts being broken away; Fig. 3 is an elevation showing the plug which houses one end of the actuating shaft; Fig. 4 is a section taken approximately on the line 4—4 of Fig. 1; and Fig. 5 is a fragmental transverse section showing a slightly modified form of the invention.

Referring to Figs. 1 to 4 of the drawings, both inclusive, the numeral 1 denotes the hub of a wheel of a locomotive engine, the same being mounted on an axle 2. In one side, the hub 1 is provided with an annular recess 3 in which a hub plate 4, or ring, is mounted. The hub plate 4 is connected with the hub 1 by any desired number of dowel pins 5, the construction being such that, although the hub plate 1 cannot rotate with respect to the axle 2 and the hub 1, a movement of the hub plate, transversely, of the hub is possible.

A ring 6 is located in the recess 3, behind the hub plate 4 and is mounted for rotation in the recess, the ring having an annular rib 7 threaded at 8 into the hub plate. The ring 6 is supplied upon its periphery with a rack 9. An opening 10 is fashioned in the hub, and a pinion 11 is disposed in the opening, the pinion meshing into the rack 9 and being carried by a shaft 12 journaled in the hub 1. The shaft 12 has a squared end 14 located in an opening 15 fashioned in the hub 1. The squared end 14 of the shaft 12 is provided with a cross slot 16, and there are seats 17 in the hub 1, about the periphery of the opening 15, as Fig. 4 will clearly disclose. The numeral 18 denotes a key adapted to be inserted in the slot 16 of the shaft 12, the ends of the key being received in selected pairs of the seats 17. A plug 19 is threaded into the opening 15 and houses the squared end 14 of the shaft 12, the plug having holes 20, whereby the plug may be manipulated by means of a spanner wrench.

In practical operation, when the shaft 12 is rotated by means of a key applied to the squared end 14 of the shaft, the pinion 11, meshing into the rack 9, rotates the ring 6, and because the ring 6 is threaded into the hub plate 4, the hub plate may be advanced or retracted when the shaft is rotated. The key 18 and the seats 17 form a convenient means whereby the shaft 12 is locked against rotation, but any other means for locking the shaft may be provided. The plug 19 may be threaded into the opening 15 to house the squared end 14 of the shaft 12, thereby preventing the shaft from being tampered with maliciously.

Passing to the modification shown in Fig. 5, the numeral 21 denotes a hub having a recess 22 within which is located a hub plate 23 threaded at 24 into a circumscribing ring 25 mounted in the recess. The ring 25, preferably, fits in the recess with a close driving engagement, so that the said ring is held against rotation with respect to the hub 21. The hub plate 23, which may be designated a ring, is supplied with an internal rack 26 engaged by a pinion 27 mounted on a shaft 28 journaled in the hub 21. The locking means for the shaft 28 is denoted by the numeral 29 and may be of the sort herein before described, or otherwise, the protecting plug being designated by the numeral 30.

That form of the invention which is disclosed in Fig. 5 does not differ greatly in operation from the form shown in Fig. 1, it being understood that when the shaft 28 is rotated, the hub plate or ring 25 will be rotated, the hub plate being advanced, because the hub plate is threaded at 24 into the relatively fixed ring 25.

Having thus described the invention, what is claimed is:—

1. In a device of the class described, a hub having a recess; rings in the recess and threaded together, one ring being fixed against rotation with respect to the hub, and the other ring being rotatable; and means for rotating the rotatable ring to secure an advancement of one ring.

2. In a device of the class described, constructed as set forth in claim 1, and further characterized by the fact that the means for rotating the rotatable ring embodies a rack on said ring, a pinion meshing into the rack, and a shaft journaled in the hub and carrying the pinion.

3. In a device of the class described, a hub having a recess; rings in the recess and threaded together, one ring being fixed against rotation with respect to the hub, and the other ring being rotatable; means for rotating the rotatable ring to secure an advancement of one ring; and a locking device coacting with said means.

4. In a device of the class described, a hub having a recess; rings in the recess and threaded together, one ring being fixed against rotation with respect to the hub, and the other ring being rotatable, the rotatable ring being provided with a rack; a shaft journaled in the hub; a pinion carried by the shaft and meshing into the rack; and means for locking the shaft against rotation.

In testimony that I claim the foregoing as my own, I have hereto affixed my signature in the presence of two witnesses.

ALBERT J. SAMS.

Witnesses:
  LEAH G. MORRISS,
  M. B. GILLA.